United States Patent [19]
Kim

[11] Patent Number: 5,879,931
[45] Date of Patent: Mar. 9, 1999

[54] AEROBIC FERMENTATION PROMOTING DEVICE OF EXCREMENTS, AEROBIC FERMENTATION SYSTEM USING IT AND COMPOST THEREFROM

[76] Inventor: Baik Ki Kim, 576 Juk San Ri, Juk San Myun, Kim Jae Kun, Chunlabukdo 577-830, Rep. of Korea

[21] Appl. No.: 687,407
[22] PCT Filed: Jan. 14, 1995
[86] PCT No.: PCT/KR95/00005
§ 371 Date: Oct. 3, 1996
§ 102(e) Date: Oct. 3, 1996
[87] PCT Pub. No.: WO95/21141
PCT Pub. Date: Aug. 10, 1995

[30] Foreign Application Priority Data

Feb. 3, 1994 [KR] Rep. of Korea ............... 1994 2048
Dec. 8, 1994 [KR] Rep. of Korea ............... 1994 33291

[51] Int. Cl.[6] ............................... C12M 1/02; C05F 3/06
[52] U.S. Cl. ................................ 435/290.2; 435/290.4; 366/345; 366/346
[58] Field of Search ................. 435/290.1, 290.2, 435/290.4; 366/345, 346; 71/9

[56] References Cited

U.S. PATENT DOCUMENTS 4,869,877  9/1989  Sellew et al. ................. 435/290.2
5,187,097  2/1993  Weber et al. ................. 435/290.2
5,395,417  3/1995  Thomas ......................... 435/290.2

FOREIGN PATENT DOCUMENTS 0 521 357   1/1993  European Pat. Off. ........ 435/290.2
2 611 419   9/1988  France ........................... 435/290.2
62-207790   9/1987  Japan ............................. 435/290.2

*Primary Examiner*—William H. Beisner
*Attorney, Agent, or Firm*—Jacobson, Price, Holman & Stern, PLLC

[57] ABSTRACT

An aerobic fermentation promoting device, a fermentation system and organic compost prepared by the system. The device promotes aerobic fermentation of compost materials by periodically mixing the compost materials together and by letting the compost materials come into contact with the outside air. The device is installed in a fermentation tank and has a rotatable screw conveyor unit, at least one bucket elevator, a drive unit and a steering unit. The compost is produced by charging moisture control materials in the tank, uniformly spraying excrement on the surface of the moisture control materials, mixing the compost materials together using the fermentation promoting device after lapse of four to seven days since spraying of the excrement, and adding new moisture control materials and new excrement to existing compost materials.

7 Claims, 12 Drawing Sheets

AEROBIC FERMENTATION PROMOTING DEVICE OF EXCREMENTS, AEROBIC FERMENTATION SYSTEM USING IT AND COMPOST THEREFROM

BACKGROUND OF THE INVENTION

1. Field of the Invention

The present invention relates to aerobic fermentation promoting device, aerobic fermention system using this device and natural fermentation compost fertilizer made from livestock excrements including human excrements and, more particularly, to a movable device for promoting aerobic fermentation device of compost raw materials comprised of the mixture of excrements and the moisture contents control materials, for example, rice hulls, sawdust, wood pieces, leaves and trunks of plants, and to an aerobic fermentation system equipped with such a fermentation promoting device, and to high quality composts fertilizer produced through this fermentation system which completely extinct various pathogenic factors like bacteria,fungi and others including vermin eggs and noxious plant seeds.

2. Description of the Prior Art

In order to make highly good nature compost fertilizer from the livestock excrements including human excrements, the aerobic fermentation process at high temperature more than 60° C. has been widely used. There are two fermentation types, first the aerobic fermentation requiring oxygen during fermentation of the compost raw materials and second the anaerobic fermentation requiring no oxygen during fermentation of the compost raw materials. However, the anaerobic fermentation process is not acceptable for the fermentation process of the organic materials because quite a lot of nourishment loss, much generation of noxious organic acid gas, unexpected propagation of pathogenic factors and many other side results happens during factors and many other side results happens during fermentation-.The aerobic fermentation at a relatively high temperature of at least 60° C. supplying appropriate amount of oxygen is recommended to overcome the bad results happened during the anaerobic fermentation process. Well-seasoned compost prepared through the aerobic fermentation process provides excellent vegetation environment conditions good for the plants.

In the prior art, there have been proposed air supply devices for compost raw materials, aiming at the abovemention point, as disclosed in U.S. Pat. No. 441,039. In the above U.S. patent, a longitudinal air supply tube is deeply inserted into compost raw material heap to supply the outside fresh air into the compost raw material heap. However, the said air supply device can not work effectively to let the fresh outside air supplied to the compost raw material heap to be uniformly distributed to all of the compost raw material enough to prevent the propagation of pathogenic factors but merely supply the fresh air just around the air outlet section of the air supply tube inserted in the compost raw material heap.

There has been proposed a fermentation system in that the compost raw materials, such as human excrement, animal excrement and the sawdust, are put in a large-sized fermentation tank capable of containing compost raw materials from several ten tons to several hundred tons. A large-sized mixer integrated with a slowly movable conveyor system is installed in the fermentation tank to mix the compost raw materials in the tank and achieve smooth fermentation of the compost raw materials. However, the said fermentation system needs a large-sized steel structure installed on the fermentation tank, the large-sized mixer device for mixing many hundred tons of the compost raw materials and a drive unit for driving the mixer device. In this regard, this fermentation system has been scarcely used in small-scaled stock farms due to its large size. The said fermentation system has another problem that it can not achieve uniform mixing ability of the raw materials and cause anaerobic fermentation partialy further to lead the additional mixing process using an agricultural power shovel.

There have been also a continuous fermentation process using silos. This process, a continuous fermentation method, has a problem of consuming too much cost constructing large scale installation of the silos so that this continuous fermentation process also was not used except large scale livestock farms. Another problem of the above continuous fermentation is that the continuous fermentation can not achieve uniform mixing of the compost raw materials and, as a result, scarcely achieves the full scale aerobic fermentation of the compost materials.

SUMMARY OF THE INVENTION

It is, therefore, an object of the present invention to provide an aerobic fermentation promoting device for promoting aerobic fermentation of raw materials by periodically mixing them and making the compost raw materials come into periodical contact with the fresh air.

It is another object of the present invention to provide an aerobic fermentation system having a fermentation tank equipped with the above fermentation promoting device.

It is a further object of the present invention to provide good quality nature organic compost fertilizer produced from the said fermentation system.

In order to accomplish the primary object, the present invention provides an aerobic fermentation promoting device comprising: a rotatable screw conveyor unit for feeding compost raw materials to its center portion and for turning over the compost raw materials to a plurality of buckets of a bucket elevator which opposed ends are mounted to the opposed side beams of a frame unit; the frame unit supporting the conveyor unit, the bucket elevator including a drive unit, the frame unit including the side beams, first to fourth extension rods extending between the side beams, and an elevator support rod for lifting and supporting a compost pouring section of the bucket elevator; the bucket elevator having a compost bucketing section at its front section and the compost pouring section at its rear section, the bucket elevator being placed under the center portion of the screw conveyor unit at the compost bucketing section and inclined upward and backward with respect to the side beams of the frame unit; the drive unit for driving the device; and a steering unit for smoothly rotating the device on guide rails of corners of a fermentation tank while reducing friction between the guide rails and the device, the steering unit including a plurality of steering rollers.

In order to accomplish the above second object, the present invention provides an aerobic fermentation system comprising: a fermentation tank connected directly to both an excrement reservoir and to a stall, and charged with compost raw materials, and equipped with a fermentation promoting device periodically mixing the compost raw materials together, the fermentation tank including: a compost discharge door provided in a side wall of the tank and adapted for discharging compost after fermentation of the final compost; arcuate guide rails placed in corners of the tank such that the guide rails are leveled with a mounting position of steering rollers mounted on the outer surfaces of side beams of the fermentation promoting device; a center wall placed in the center of the tank, the center wall being provided with outside air supply means and excrement supply means; a roof stretched over the tank, the roof being provided with a first excrement supply duct, the excrement supply duct extending from the excrement reservoir and provided with a first excrement spraying nozzle so that the excrement of the reservoir is supplied to the nozzle through the duct and sprayed by the spraying nozzle; and openable curtains provided on the sides of the roof, the curtains being closed or opened in order to control temperature inside the tank.

In order to accomplish the above third embodiment, the present invention provides nature organic compost fertilizer produced by a process comprising the steps of: charging the fermentation tank in claim 6 with the moisture control materials, that is, rice hulls, sawdust, wood pieces, leaves and trunks of plants; uniformly spraying excrement on the surface of the moisture control materials fully charged in the tank and forming compost raw materials; mixing the compost raw materials together using a fermentation promoting device of claim 1 or 5 after lapse of one to seven days after spraying the excrements; newly adding moisture control materials and excrement to the surface of the compost raw materials present in the tank about one or two volume % of the existing compost raw materials when necessary or day after day; and repeating this process after a period then to discharge the fully fermented fertilizer.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
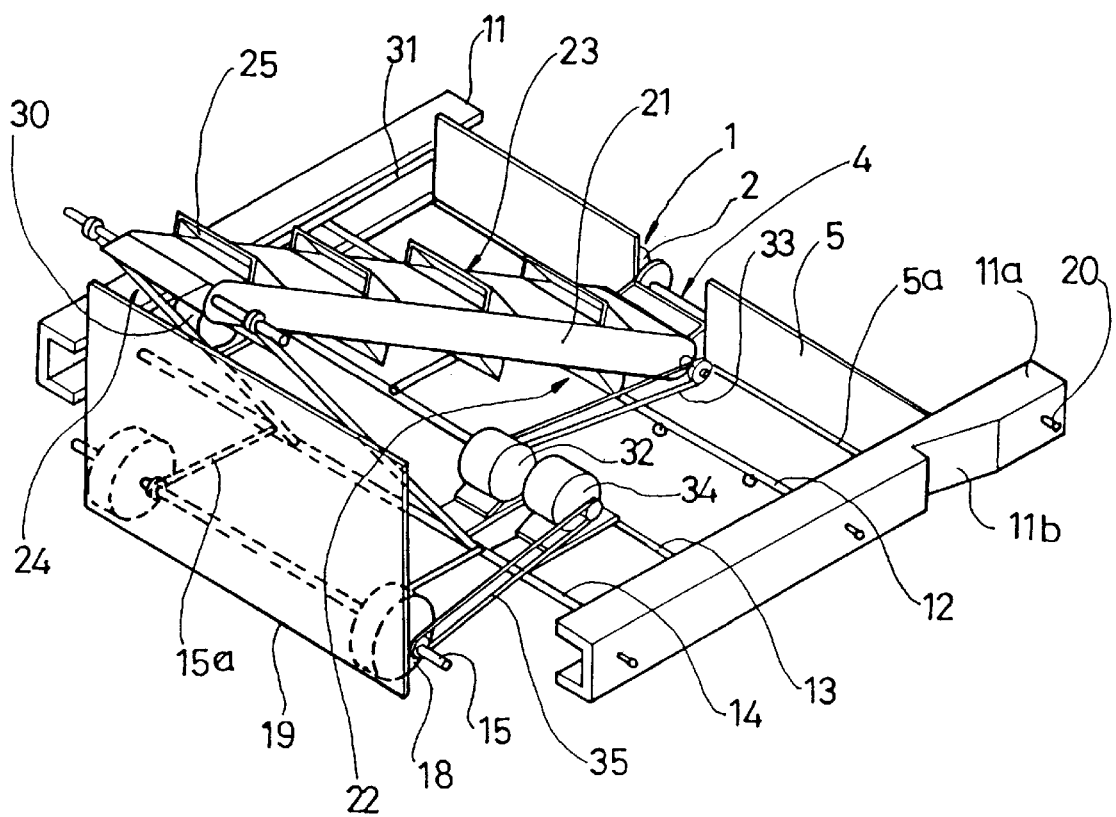
FIG. 1 is a perspective view showing a construction of a fermentation promoting device in accordance with a first embodiment of the present invention.
Figure 2:
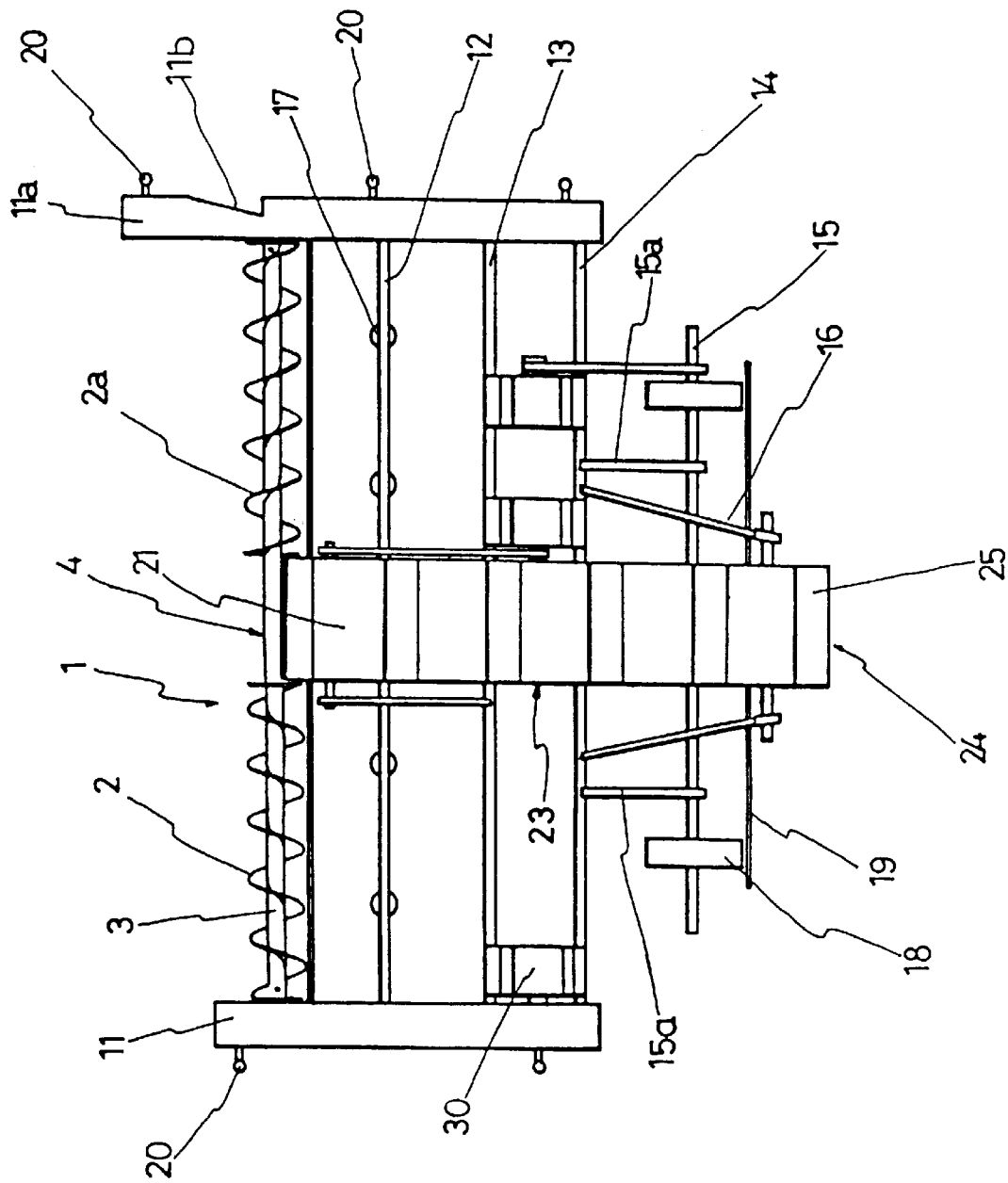
FIG. 2 is a plan view of the fermentation promoting device of FIG. 1.

FIG. 1 is a perspective view showing a construction of a fermentation promoting device in accordance with a first embodiment of the present invention, and FIG. 2 is a plan view of the fermentation promoting device of FIG. 1.

Figure 3:
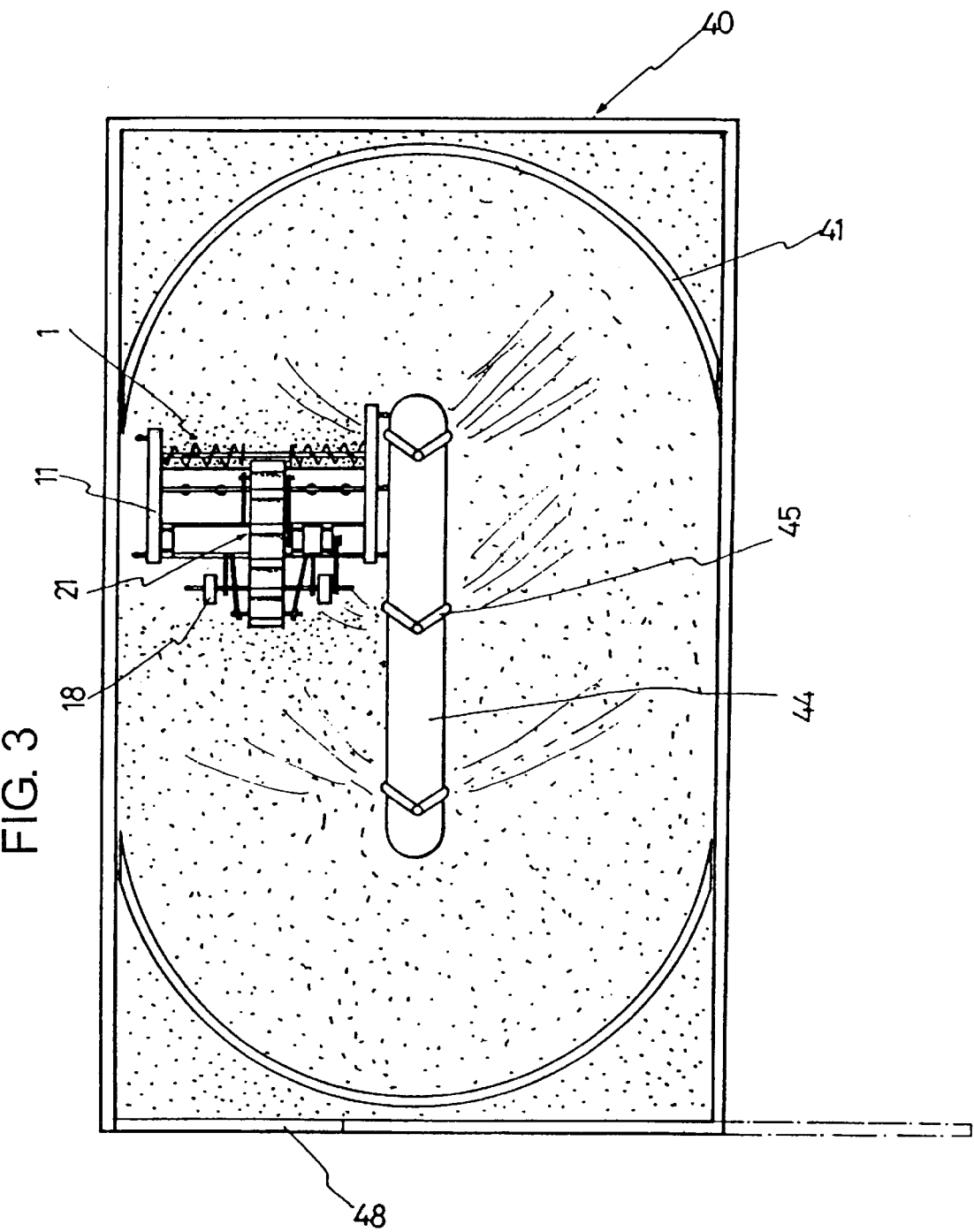
FIG. 3 is a plan view of a fermentation tank provided with the fermentation promoting device of FIG. 1.

As shown in the drawings, the movable fermentation promoting device of the first embodiment of the invention includes a rotatable screw conveyor unit 1, the opposed ends of which unit 1 are rotatably mounted to a pair of opposed side beams 11 and 11a in the front section of the device. The fermentation promoting device also includes a frame unit for supporting the conveyor unit 1, a bucket elevator and a drive unit thereon. The frame unit includes a pair of side beams 11 and 11a, which side the opposed sides of the device and are coupled to each other by means of a plurality of extension rods 12, 13, 14 and 15 extending between the beams 11 and 11a in parallel. The longitudinal rods 12 to 15 also hold, for example, drive motors and traveling wheels. The frame unit also includes a pair of elevator support rods 16, which support rods 16 extend upward from the third extension rod 14 such that the rods 16 are inclined. The support rods 16 support the opposed sides of a lifted section of the bucket elevator 21 such that the rods 16 lift the compost pouring section of the elevator 21. The bucket elevator 21 is placed, at its compost bucketing section 22, under the center portion of the screw conveyor unit 1 and lifted upward and backward such that the bucket elevator 21 is upward inclined with respect to the side beams 11 and 11a. The lifted rear end of the bucket elevator 21 is supported by the pair of support rods 16 as described above. That is, the bucket elevator 21 is inclined upward and backward such that a plurality of buckets 25 pass under the center portion 4 of the screw conveyor unit 1 while keeping their mouths horizontally. The bucket elevator 21 is provided with the buckets 25, which buckets 25 carried on a conveyor belt of the elevator 21 and spaced out at regular intervals. The fermentation promoting device also includes a drive unit for generating rotating force for driving the motor-operated elements of the device, such as the screw conveyor unit 1 and the bucket elevator 21. The fermentation promoting device further includes a steering unit for slowly rotating the device along guide rails 41 installed in corners of a fermentation tank 40 as shown in FIG. 3, which steering unit includes a plurality of steering rollers 20 provided on the outside surfaces of the side beams 11 and 11a.

In the fermentation promoting device, the rotatable screw conveyor unit 1 includes a screw shaft 3, the opposed ends of which shaft 3 are rotatably mounted to the pair of opposed side beams 11 and 11a respectively in the front part of the device. The conveyor unit 1 is divided into two sections, that is, left and right sections, about its center portion 4. The left and right sections of the screw shaft 3 of the conveyor unit 1 are provided with their feed screws 2 and 2a whose screwing directions are opposed to each other such that the screws 2 and 2a feed the compost materials in the fermentation tank to the center portion 4 as shown in FIG. 2. That is, as the screwing directions of the screws 2 and 2a are opposed to each other about the center portion 4, the compost raw materials can be forcibly fed to the center portion 4 due to rotation of the opposed directional screws 2 and 2a. A compost bucketing section 22 of the bucket elevator 21 passes under the center portion 4 of the screw conveyor unit 1 so that the compost raw materials fed to the center portion 4 of the unit 1 are loaded in the buckets 25. The front of the screw conveyor unit 1 is opened but the divided sections of the unit 1 are backed by their associated guide plates 5. The bottom ends of the guide plates 5 are provided with rounded elastic rubber plates 5a so that the compost raw materials are pushed up to the screws 2 and 2a when the fermentation promoting device advances.

The fermentation promoting device includes the frame unit as described above. The frame unit includes the pair of side beams 11 and 11a, which beams 11 and 11a are coupled to each other by means of at three extension rods, that is, the first to fourth extension rods 12, 13, 14 and 15 extending between the beams 11 and 11a in parallel. The frame unit also includes the pair of elevator support rods 16, which support rods 16 inclinedly extend upward from the third extension rod 14 such that they lift and support the opposed sides of the compost pouring section of the bucket elevator 21 and let the bucket elevator 21 be inclined upward and backward at an inclination angle of 65°–85°. The support rods 16 may be more heightened in response to height of the compost fermentation tank 40. In addition, the frame unit of the device may be provided with at least two pairs of support rods 16 when the device is provided with at least two bucket elevators 21. In this case, the compost treatment capacity of the device will be increased.

The first extension rod 12 is provided with a plurality of wheels 17, each of which wheels 17 rotatable at 360° has a plurality of lugs. The drive motors 30, 32 and 34 of the drive unit are held between the second and third extension rods 13 and 14. The fourth extension rod 15 may be coupled to the side beams 11 and 11a or coupled to the second and third extension rods 13 and 14 through support beams 15a. A pair of rotatable wheels 18 having a plurality of lugs are fitted over opposed end sections of the fourth extension rod 15. A rear protector plate 19 is mounted to the pair of elevator support rods 16 such that the protector plate 19 extends upward and prevents introduction of the compost raw materials into the inside of the device. At least two pairs of steering rollers 20 for letting slow rotating motion of the fermentation promoting device along the guide rails 41 of the corners of the fermentation tank 40 are placed on the outside surfaces of the side beams 11 and 11a and roll on the guide rails 41. The number of steering rollers 20 may be changed in accordance with length of each of the side beams 11 and 11a in such a manner that the rollers 20 minimize the frictional contact between the rollers 20 and the guide rail 41 of the fermentation tank 40.

In the bucket elevator 21, the compost bucketing section 22 of the elevator 21 passes under the center portion 4 of the screw conveyor unit 1 so that the compost raw materials fed to the center portion 4 of the unit 1 is loaded in the buckets 25, while a compost pouring section 24 of the elevator 21 is supported by the elevator support rods 16 extending upward from the third extension rod 14. The plurality of buckets 25 are carried on the power transmission means 26, such as an endless belt or an endless chain. The buckets 25 placed on the means 26 are spaced out at regular intervals. When the power transmission means 26 of the elevator 21 is rotated, the compost materials are loaded in the buckets 25 at the compost bucketing section 22 of the elevator 21 and fed to the compost pouring section 24 of the elevator 21. At the compost pouring section 24 of the elevator 21, the buckets 25 are turned at 180° so that the compost raw materials loaded in the buckets 25 are dropped to the bottom of the tank 40 in back of the protector plate 19. The opposed sides of the power transmission means 26 are supported by a plurality of support rollers 27. The support rollers 27 are maintained in their predetermined positions and support the rotating motion of the power transmission means 26.

Of course, it should be understood that the fermentation promoting device of the invention may be provided with two or more bucket elevators in accordance with size of the fermentation tank 40 as will be described in detail in a second embodiment of the invention.

The drive unit of the fermentation promoting device includes the plurality of drive motors which are supported between the second and third extension rods 13 and 14 of the frame unit. The first drive motor 30 of the drive unit, which motor 30 is placed between the extension rods 13 and 14 at the inside of the side beam 11, is connected to the screw conveyor unit 1 through first belt or chain transmission means 31, thus to drive the screw conveyor unit 1. The second drive motor 32 of the drive unit is connected to a sprocket or pulley shaft of the bucket elevator 21 through second belt or chain transmission means 33, thus to drive the bucket elevator 21. The third drive motor 34 of the drive unit is connected to the fourth extension rod 15 through third belt or chain transmission means 35, thus to rotate the wheels 18 of the fourth extension rod 15. Each of the above drive motors 30, 32 and 34 is provided with reduction gears for transmitting the rotational force thereof to an associated driven member while controlling the rotating velocity. During the compost mixing operation of the fermentation promoting device, the drive motors 30, 32 and 34 of the drive unit continue their rotating operations.

Figure 4:
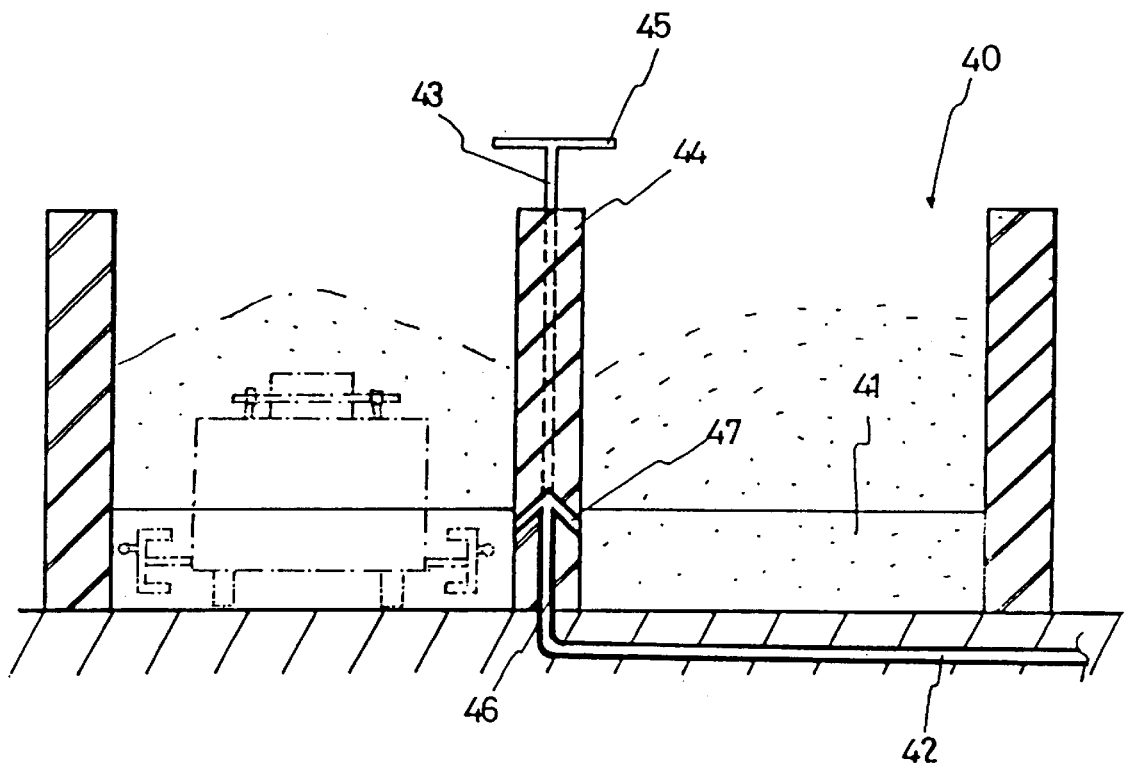
FIG. 4 is a sectional view of the fermentation tank of FIG. 3, particularly showing excrement supply means and outside air supply means.
Figure 5:
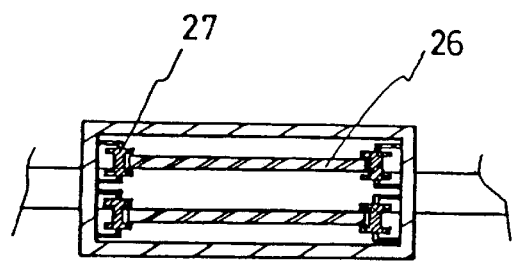
FIG. 5 is a sectional of a bucket elevator of the fermentation promoting device of FIG. 1.
Figure 6:
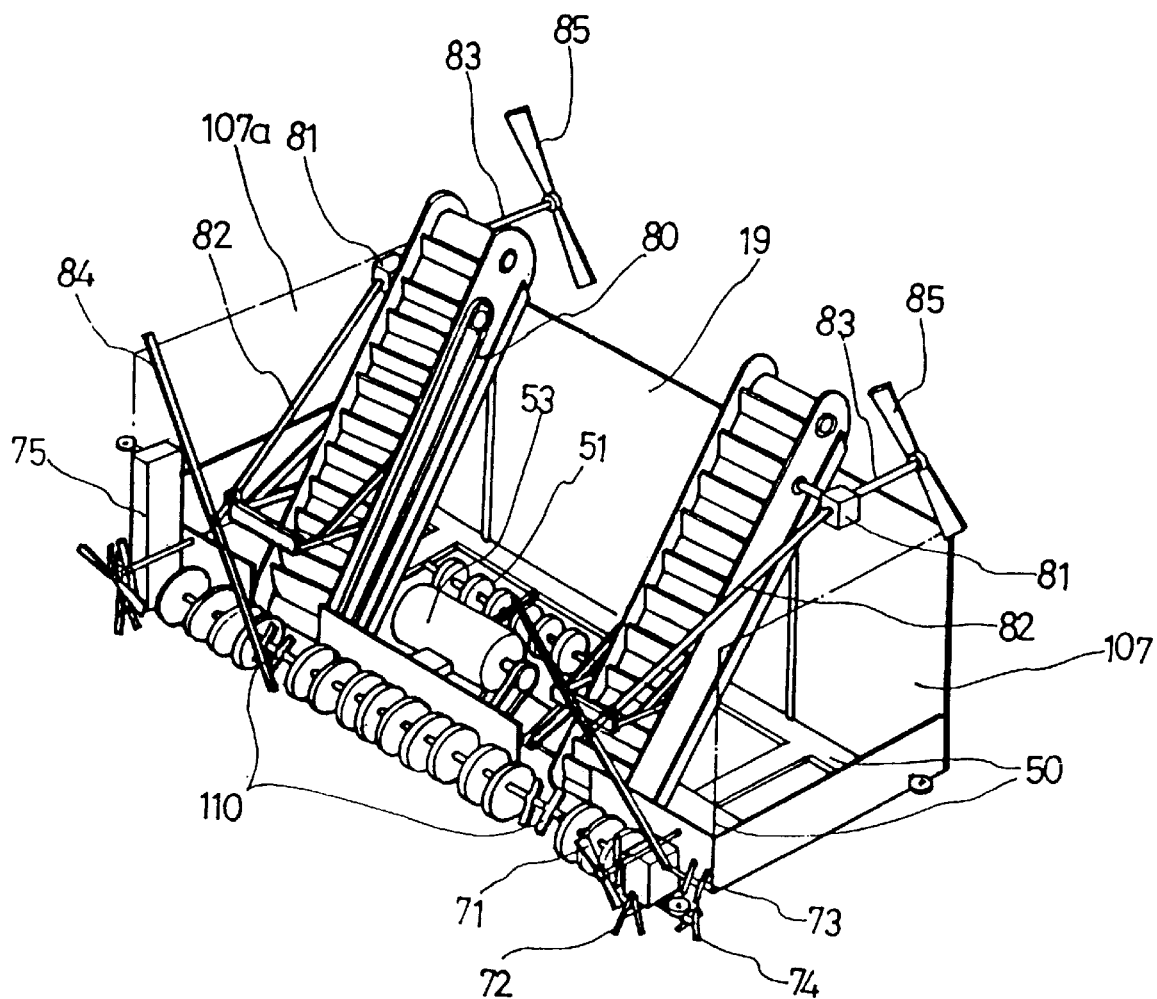
FIG. 6 is a perspective view showing a construction of a fermentation promoting device in accordance with a second embodiment of the present invention.

FIG. 3 is a plan view showing the fermentation promoting device installed in the fermentation tank 40, FIG. 4 is a sectional view of the fermentation tank 40 equipped with fermentation promoting device and charged with compost materials, and FIG. 5 is a partial sectional of the bucket elevator 21 of the fermentation promoting device of the invention.

As shown in the drawings, the fermentation tank 40 equipped with the fermentation promoting device of the invention is a rectangular tank having the arcuate guide rails 41 in its corners. Each of the guide rails 41 is leveled with a mounting position of the steering rollers 20 of the side beams 11 and 11a of the device so that the guide rails 41 let the steering rollers 20 smoothly roll on the rails 41 and smoothly turn in the corners of the tank 40. In the present invention, the right side beam 11b is preferably provided with an inclined notch 11b for letting more smooth travelling motion of the fermentation promoting device in the fermentation tank 40. The center of the fermentation tank 40 is provided with a center wall 44, which center wall 44 has an outside air supply means as well as an excrement supply means. The top of the fermentation tank 40 is opened, while a side wall of the tank 40 is provided with an openable compost discharge door 48 for discharging fermented compost to the outside of the fermentation tank 40. As shown in FIG. 4, the excrement supply means of the center wall 44 includes an excrement spraying nozzle 45 provided on the top of the center wall 44, which excrement spraying nozzle 45 is connected to an excrement supply duct 43. The excrement spraying nozzle 45 uniformly sprays the excrement, such as human excrement or animal excrement, onto the surface of the compost materials heaped in the fermentation tank 40. The other end of the excrement supply duct 43 extends to an excrement reservoir (not shown), thus to supply the excrement of the excrement reservoir to the excrement spraying nozzle 45. The outside air supply means of the center wall 4 includes an air supply duct 46 which communicates with the outside of the tank 40 through an outside air supply pipe 42. In order to inject the outside air into the compost in the tank 40, the air supply duct 46 opens to the opposed side surfaces of the center wall 44 through a plurality of air injection nozzles 47. In the air supply means, the air injection nozzles 47 are directed downward, while the air supply pipe 42 is buried in the ground. The air supply means are used for supply of fresh air into the compost in the tank 40 and for washing of the fermentation promoting device in the fermentation tank 40.

Hereinbelow, the operational effect of the fermentation promoting device according to the first embodiment of the invention and the operational effect of the fermentation system equipped with the fermentation promoting device will be described.

In order to prepare compost through aerobic fermentation using the above fermentation system, the moisture contents control materials such as rice hulls, sawdust, wood pieces, leaves and trunks of plants are heaped in the fermentation tank 40 to a height. During heaping the moisture control materials in the tank 40, the fermentation promoting device is placed in the fermentation tank 40 as shown in FIG. 3. After heaping of the moisture control materials, the excrement such as human excrement and livestock excrement of the excrement reservoir is supplied under pressure to the excrement spraying nozzle 45 through the excrement supply duct 43 in a conventional manner so that the excrement is uniformly sprayed from the nozzle 45 to the surface of the moisture control materials in the tank 40 as shown in FIG. 3 and uniformly covers the moisture control materials.

After spraying the excrement onto the moisture control materials, the fermentation promoting device is turned on so that the first to third drive motors 30, 32 and 34 of the drive unit start and drive the screw conveyor unit 1, the bucket elevator 21 and the wheels 18 of the fourth extension rod 15 at predetermined rotating velocities respectively. Therefore, the feed screws 2 and 2a whose screwing directions are opposed to each other about the center portion 4 are rotated in opposed directions so that the compost materials, comprising the excrement and the moisture control materials, are forcibly fed to the center portion 4 of the screw conveyor unit 1. In this case, as the bucket elevator 21 is rotated and the compost bucketing section 22 of the bucket elevator 21 passes under the center portion 4, the compost materials fed to the center portion 4 by the feed screws 2 and 2a of the unit 1 is loaded in the buckets 25 of the bucket elevator 21. The buckets 25 loaded with the compost materials move upward along the slope 23 of the bucket conveyor 21 and reach the compost pouring section 24 of the elevator 21. At the compost pouring section 24 of the bucket elevator 21, the buckets 25 loaded with the compost materials are turned at 180° so that the compost materials are poured from the buckets 25 onto the bottom of the tank 40 in back of the protector plate 19. Therefore, the compost materials are sufficiently mixed together and heaped on the bottom of the tank 40 in back of the protector plate 19 of the forward advancing device. The compost raw materials also come into contact with air.

The above compost materials mixing operation is carried out while the fermentation promoting device slowly advances forward in the fermentation tank 40 due to the rotating motions of the wheels 18 by the rotating force of the third drive motor 34 of the drive unit. In this regard, the compost raw materials come into repeated contact with air while the compost raw materials are fed to the center portion 4 of the screw conveyor unit 1 by the opposed directional rotating motions of the feed screws 2 and 2a, and fed by the bucket elevator 21, and dropped onto the bottom of the tank 40 in back of the protector plate 19. Therefore, sufficient amount of air is supplied so that the fermentation promoting device of the invention promotes the aerobic fermentation. In the present invention, it is preferred to mix the compost materials together by the fermentation promoting device of the invention at 4–7 day intervals so that the device is preferably controlled so as to carry out the compost material mixing operation at the above time intervals.

When the fermentation promoting device of the invention continuously travels and reaches a corner of the tank 40, the wheels 18 of the device intend to continue the forward travelling of device so that there is a difference of radius of gyration between the inside and outside wheels 18 of the device. In order to let the device smoothly turn the corner of the tank 40, the rollers 20 of the device are raid on the guide rail 41 of the fermentation tank 40 when the outside beam 11 comes into contact with the side wall of the guide rail 41. As the rollers 20 roll on the guide rail 41 in the corner of the tank 40, the fermentation promoting device smoothly turns in the corner of the device. As the fermentation promoting device travels in the fermentation tank 40 at a predetermined velocity, the device periodically mixes the compost materials turning up side down and promotes high temperature aerobic fermentation of the compost so that the fermentation system having the fermentation promoting device of the invention prepares good compost within about 10–15 days.

After preparation of the compost, the compost discharge door 48 of the fermentation tank 40 is opened and the prepared compost is discharged from the tank 40. As described above, the fermentation promoting device of the invention and the fermentation system having the device prepare the good organic compost using the excrement, such as the human excrement and the animal excrement, which excrement may pollute environment when discarded without appropriate treatment. The fermentation promoting device of the invention is light, small-sized and easily manufactured so that the fermentation system with the device can be preferably installed and used in a small-scaled stock farm as an animal excrement treatment system.

The above fermentation promoting device having one bucket elevator 21 according to the first embodiment of the invention may be preferably used in a small-scaled stock farm discharging the small amount of animal excrement in a day. However, as the above device has one bucket elevator 21, the operational capacity of the above device is deficient in effective excrement treatment of a large-scaled stock farm such as a stock farm, for example, a large-scaled pig breeder having at least 1000 heads of pig, discharging animal excrement of at least 4–6 tons in a day. When using the small capacity fermentation promoting device of the first embodiment of the invention in such a large-scaled stock farm, the device inevitably lets unfermented compost materials be heaped on the bottom and the corners of the tank 40 so that the device can not prevent rotting of the unfermented compost materials.

In order to overcome the above problem, a second embodiment of the invention provides a large-scaled fermentation promoting device provided with two bucket elevators and suitable for used in a large-scaled fermentation tank. The large-scaled fermentation promoting device of the second embodiment can be preferably used for treatment of large amount of compost materials.

Figure 10:
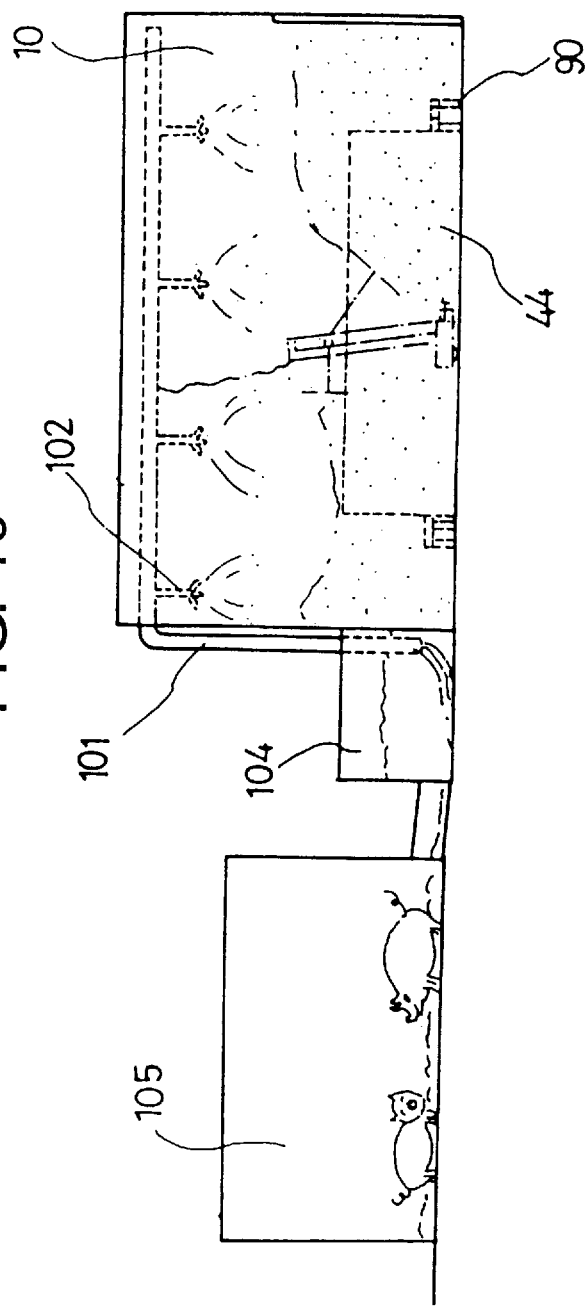
FIG. 10 is a schematic view showing a construction of a fermentation system systematized by a stall, an excrement reservoir and the fermentation tank having the fermentation promoting device of FIG. 6.
Figure 11:
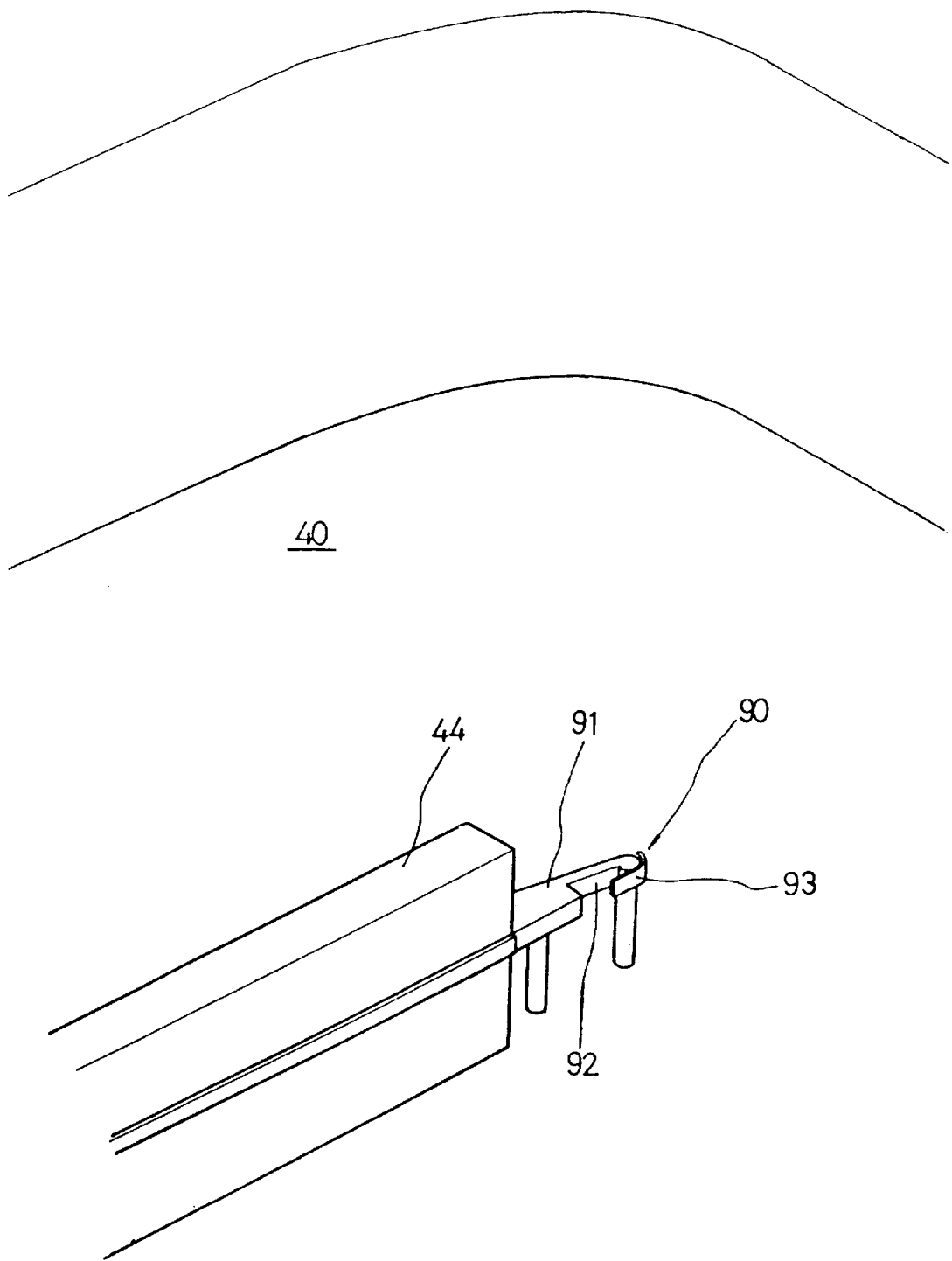
FIG. 11 is a partial perspective view of the fermentation promoting device installed in the fermentation tank of the fermentation system of FIG. 10, particularly showing a direction guide unit of the device.
Figure 12:
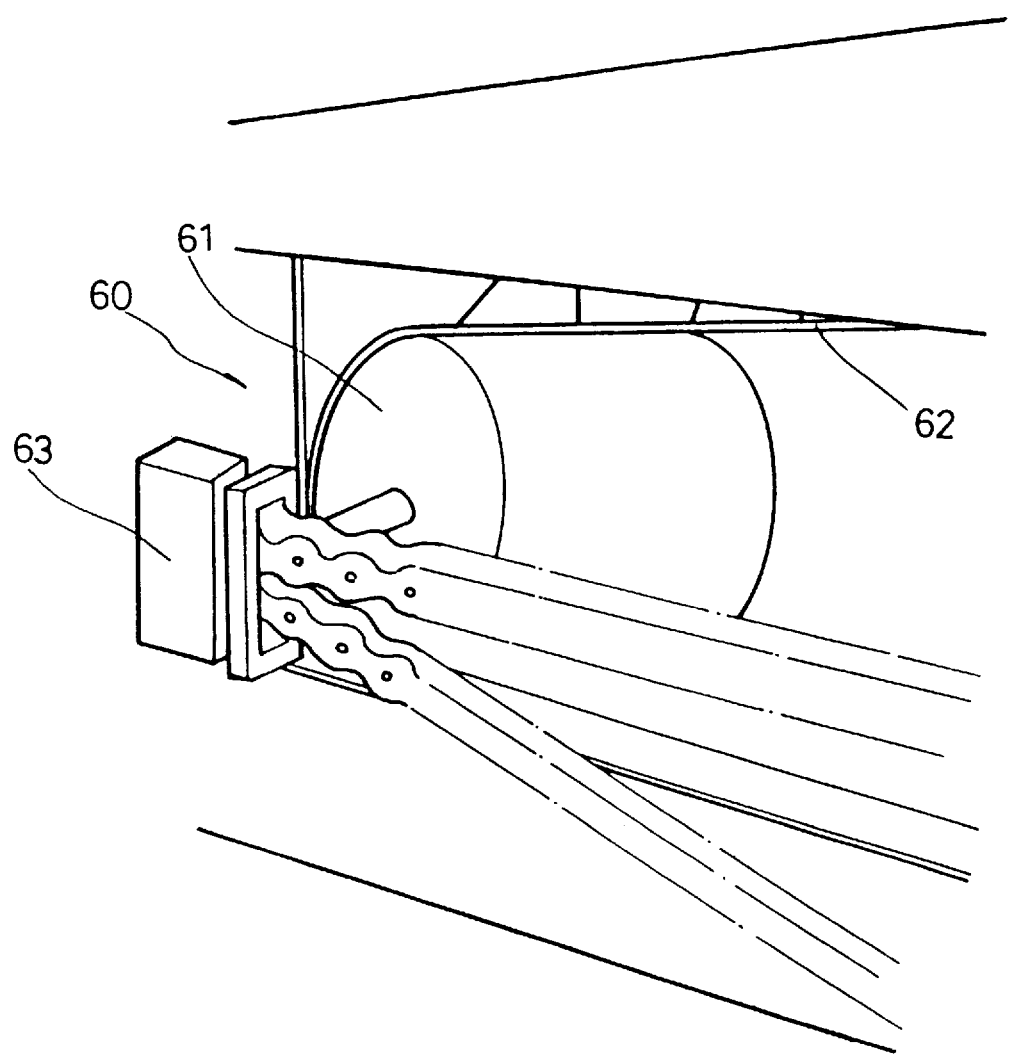
FIG. 12 is a partial enlarged perspective view of a screw conveyor unit of the fermentation promoting device of FIG. 6.
Figure 13:
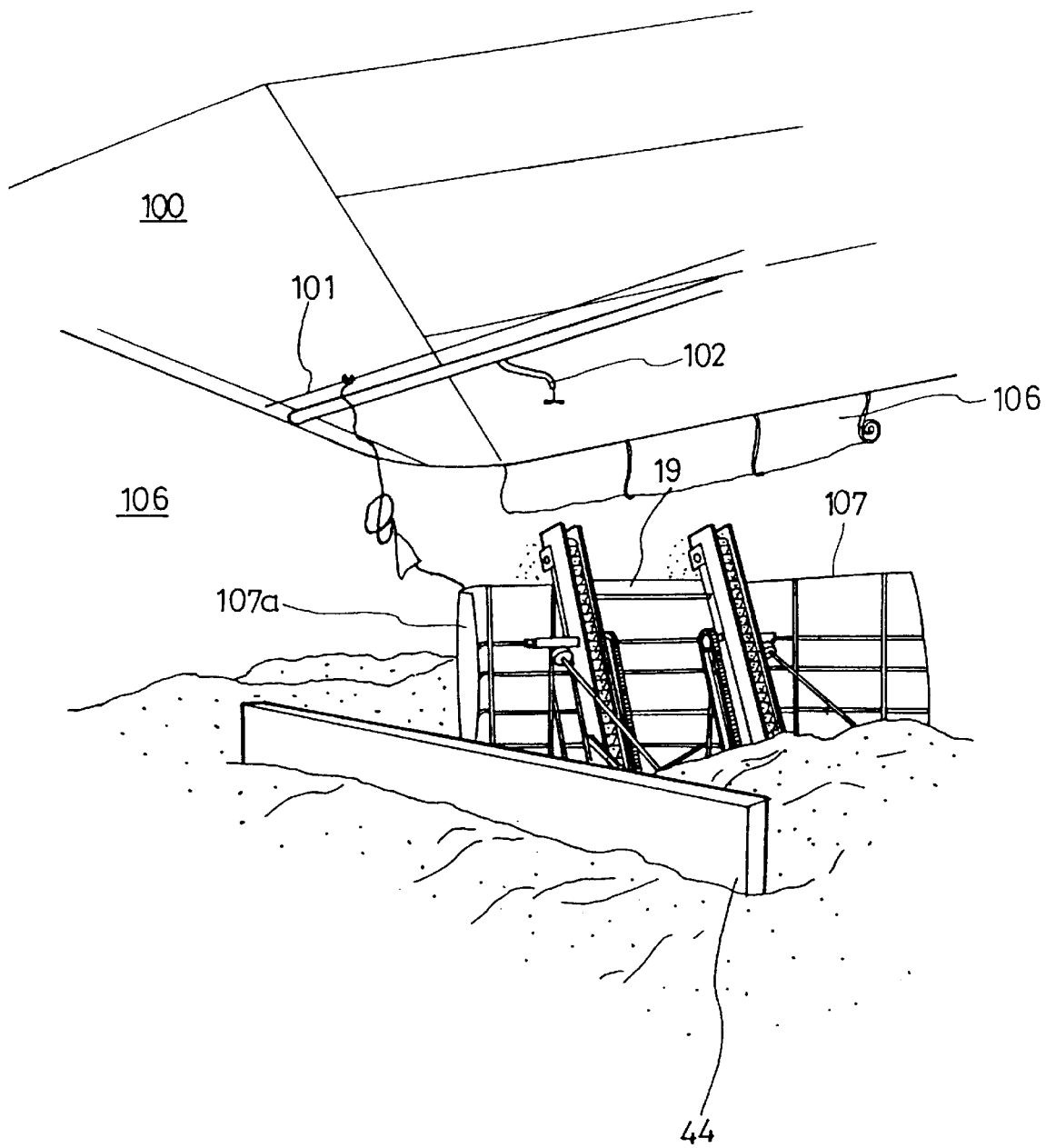
FIG. 13 is a perspective view showing the fermentation tank provided with the fermentation promoting device of FIG. 6, particularly showing excrement supply means suspended by the roof of the fermentation tank.

Hereinbelow, the large-scaled fermentation promoting device having the two bucket elevators according to the second embodiment will be described with reference to the drawings, FIGS. 6 to 13. FIGS. 6 to 9 shows the fermentation promoting device of the second embodiment, FIG. 10 shows a fermentation system having the fermentation promoting device, FIG. 11 shows a direction control unit of the fermentation promoting device, FIG. 12 shows of a screw conveyor unit of the fermentation promoting device, and FIG. 13 shows the fermentation system, particularly showing excrement supply means suspended by the roof of a fermentation tank.

As described for the device of the first embodiment, the large-scaled fermentation promoting device of the second embodiment includes a screw conveyor unit for feeding compost materials to compost bucketing sections of the two bucket elevators and for turning over the compost materials to the buckets of the bucket elevators. The bucket elevators feed the compost materials from the front to the back of the device and pour the compost materials onto the bottom of the fermentation tank in back of the device. The device also includes a frame unit for support the screw conveyor unit and the bucket elevators, and a drive unit for generating rotating force for driving the motor-operated elements of the device, such as the screw conveyor unit and the bucket elevators. The fermentation promoting device further includes a steering unit for slowly rotating the device along guide rails installed in corners of a fermentation tank, which steering unit includes a plurality of steering rollers provided on the outside surfaces of the side beams of the device. The drive unit includes a drive motor 53 carried on a bottom frame 50, which drive motor 53 is connected to a main drive shaft 52 through a power transmission unit. The drive shaft 52 in turn is coupled to a screw conveyor unit 60, two scraper drive units 70 and two harrow drive units 80, thus to rotate the units 60, 70 and 80.

Differently from the device of the first embodiment, the fermentation promoting device of the second embodiment is provided with one drive motor 53 which generates the rotating force efficiently commonly used for the conveyor unit 60, the scraper drive units 70 and the harrow drive units 80. In the device, the rotating force of the drive motor 53 is directly transmitted to at least two rear wheels 51 provided in the rear section of the bottom frame 50 as well as to the main drive shaft 52 placed in the front section of the bottom frame 50. The drive shaft 52 in turn is coupled to the screw conveyor unit 60, the scraper drive units 70 and the harrow drive units 80 through typical power transmission units, such as power transmission chains, power transmission belts or power transmission gears.

In the fermentation promoting device of the invention, the main drive shaft 52 longitudinally extends between opposed sides of the front section of the bottom frame 50. The shaft 52 is always rotated by the rotating force of the drive motor 53 during operation of the device. Therefore, the screw conveyor unit 60, the scraper drive units 70 and the harrow drive units 80 connected to the drive shaft 52 through the power transmission units are applied with the rotational force of the shaft 52 and driven by the rotational force converted by their power converting means.

The general construction of the screw conveyor unit 60 of the device of the second embodiment remains the same as that of the screw conveyor unit 1 of the first embodiment. However, the screw conveyor unit 60 of this device should feed the compost materials to the two bucket elevators 21. In order to transmit the rotating force of the main drive shaft 52 to the screw conveyor unit 60, a pair of friction rollers 61 are connected to the main drive shaft 52 through a side conveyor power transmission unit 63 as shown in FIG. 12. The friction rollers 61 of the drive shaft 52 in turn are connected to the screw conveyor unit 60 through their associated power transmission belts 62 wrapped about the rollers 61. The side conveyor power transmission unit 63 provided between the main drive shaft 52 and the friction roller 61 controls both the rotating velocity and the rotating direction of the rollers 61.

The scraper drive units 70 are placed in the opposed front side corners of the device respectively. Each scraper drive unit 70 includes a front top scraper 71 and a front bottom scraper 72, which front scrapers 71 and 72 are placed in the front of each front corner of the device. Each scraper drive unit 70 also includes a side top scraper 73 and a side bottom scraper 74, which side scrapers 73 and 74 are placed at the side of each front corner of the device. The front scrapers 71 and 72 and the side scrapers 73 and 74 are connected to the main drive shaft 52 through a power transmission unit 75 so that the rotating directions and the rotating velocities of the scrapers 71 to 74 are controlled by the power transmission unit 75.

Each of the harrow drive units 80 is provided on the top section of the inside surface of an associated bucket elevator 21 and connected to the main drive shaft 52 through a power transmission unit 81, which unit 81 is provided in the outside of the associated bucket elevator 21. Each harrow drive unit 80 includes a front harrow drive shaft 82 and a rear harrow drive shaft 83 extending from the power transmission unit 81 in opposed directions. The front end of the front harrow drive shaft 82 is provided with a rotatable front harrow 84, while the rear end of the rear harrow drive shaft 83 is provided with a rotatable rear harrow 85. Each front harrow 84 and an associated rear harrow 85 may be formed into at least two-stage structures in accordance with the heaping height of the compost materials in the fermentation tank 40 as shown in dash and dot of FIG. 9.

In the fermentation promoting device of the second embodiment, front and rear ends of the center wall 44 of the fermentation tank 40 equipped with the device are provided with direction control units 90 respectively as shown in FIGS. 10 and 11. Each direction control unit 90 for controlling the turning direction of the device in the tank 40 is constructed such that it is leveled with the steering rollers 20 of the device. One side surface of each direction control unit 90 is a taper surface 91, which surface 91 is tapered to the turning direction of the device. The other side surface of each direction control unit 90 is provided with a notch 92. The tip of each direction control unit 90 may be provided with a semicircular guide rail 93 as demanded. As shown in FIG. 13, the top of the fermentation tank 40 having the device is covered with a roof 100. An excrement supply means is suspended by the roof 100 of the tank 40. The excrement supply means includes an excrement supply duct 101 longitudinally extending along the roof 100. The excrement supply duct 101 extends from an excrement reservoir 104. A plurality of excrement spraying nozzles 102 extend from the duct 101 in the tank 40 so that the excrement of the reservoir 104 is supplied to the nozzles 102 through the duct 101 and sprayed by the spraying nozzles 102. The roof 100 of the fermentation tank 40 is provided with openable curtains 106 so that the sides of the interior space of the fermentation tank 40 covered with the roof 100 can be closed or opened in order to control the temperature in the tank 40. The excrement reservoir 104 in turn is connected to a stall 105 so that the stall 105, the excrement reservoir 104 and the fermentation tank 40 provided with the fermentation promoting device are systematized into the fermentation system as shown in FIG. 10.

Figure 7:
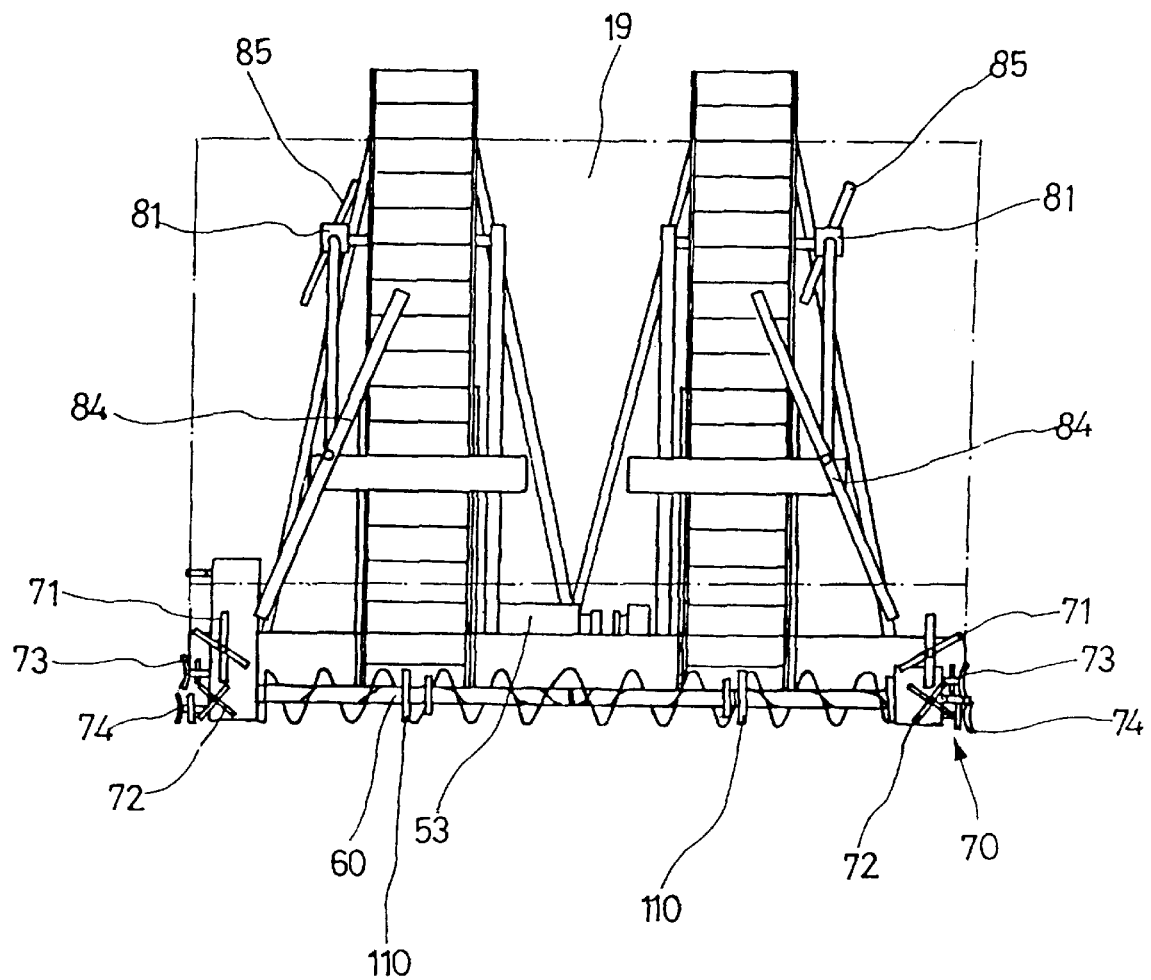
FIG. 7 is a front view of the fermentation promoting device of FIG. 6.
Figure 8:
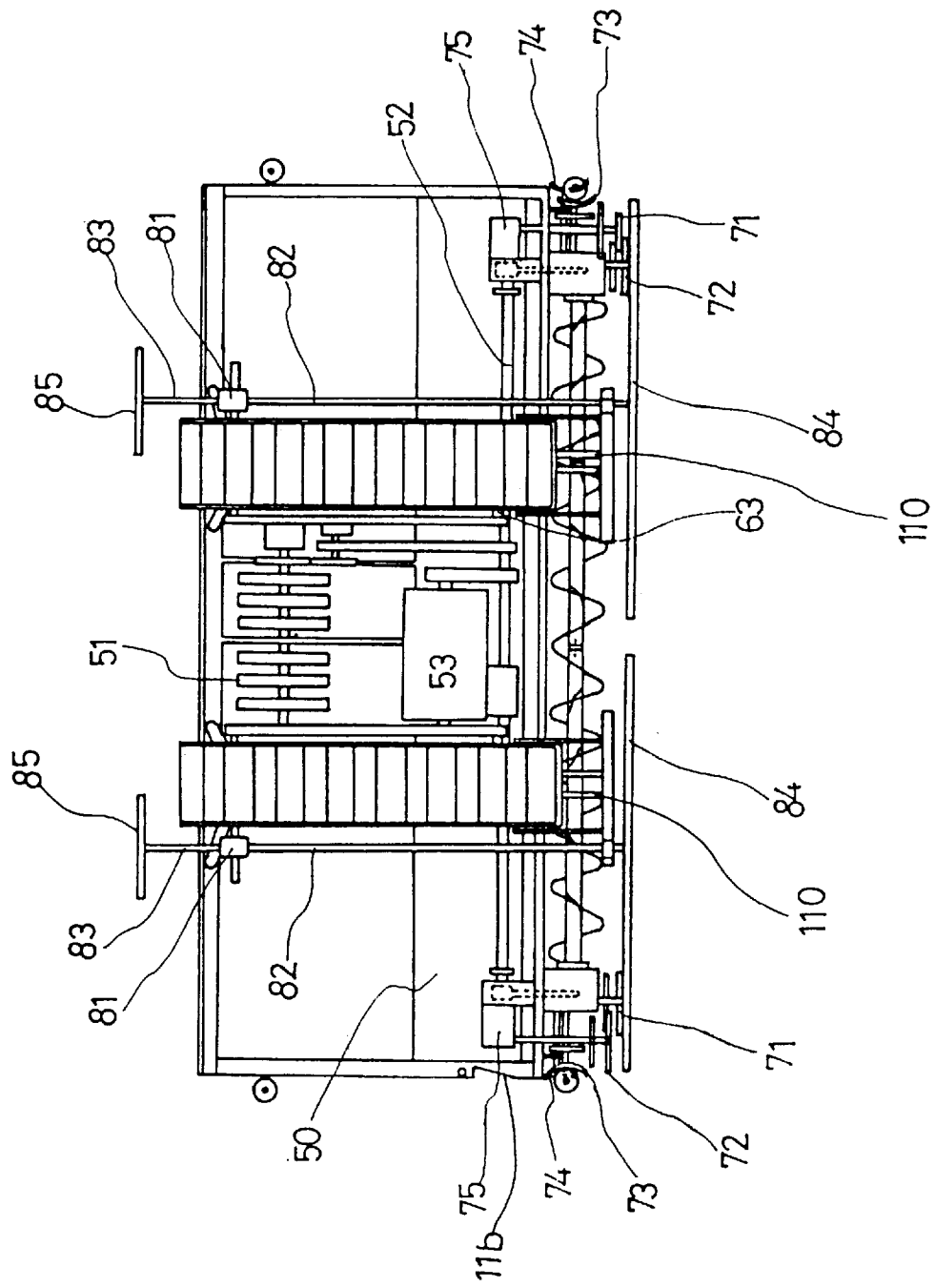
FIG. 8 is a plan view of the fermentation promoting device of FIG. 6.
Figure 9:
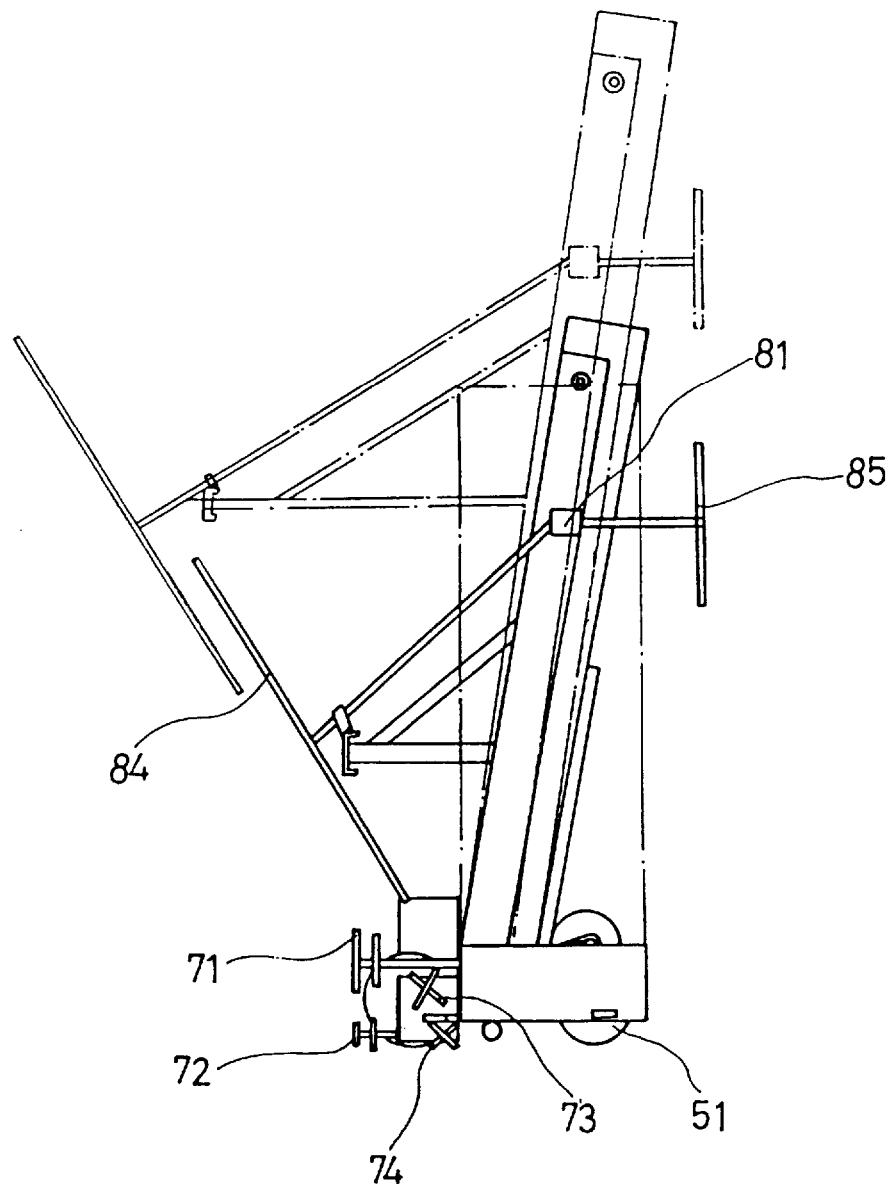
FIG. 9 is a side view of the fermentation promoting device of FIG. 6.

As the fermentation promoting device of the second embodiment is provided with the two bucket elevators 21, the screw conveyor unit 60 for the bucket elevators 21 is divided into four screw sections, that is, two pairs of left and right screw sections. The screw sections of the screw conveyor unit 60 are placed sides about the compost bucketing sections of the bucket elevators 21 in opposed side respectively. Each pair of left and right screw sections of the screw conveyor unit 60 are provided with their feed screws whose screwing directions are opposed to each other as shown in FIG. 7. As the screwing directions of each pair of screw sections are opposed to each other about the compost bucketing section of an associated bucket elevator 21, the compost materials can be forcibly fed to the compost bucketing section of the bucket elevator 21 due to rotation of the opposed directional feed screws of the unit 60. When the fermentation promoting device of the invention is provided with three or more bucket elevators 21, the screw conveyor unit 60 of the device will be divided into six or more screw sections, that is, three or more pairs of left and right screw sections, in the manner similar to that described for the screw conveyor unit 60 of the second embodiment. In addition, the fermentation promoting device of the second embodiment is provided with a pair of center scrapers 110 for scraping the compost materials at the center of the device.

The fermentation promoting device of the second embodiment is provided with a pair of side protector plates, that is, a left side protector plate 107 and a right side protector plate 107a, besides the rear protector plate 19. The protector plates 19, 107 and 107a prevent introduction of the compost materials into the device during the compost material mixing operation of the device. Of course, it should be understood that the heights of the protector plates 19, 107 and 107a may be adjusted in accordance with the heaping height of the compost materials in the fermentation tank 40.

The operational effect of the fermentation system having the above fermentation promoting device of the second embodiment will be described hereinbelow.

When the fermentation promoting device is turned on, the rotational force of the drive motor 53 is transmitted to the main drive shaft 52 through the power transmission unit such as the power transmission chain, thus to rotate the shaft 52. The rotating force of the drive shaft 52 is transmitted to the friction rollers 61 through the side conveyor power transmission unit 63 of the screw conveyor unit 60 so that the power transmission belts 62 wrapped about the friction rollers 61 are turned due to rotating motions of the rollers 61. The rotating force of the main drive shaft 52 is also transmitted to the scraper power transmission unit 75, thus to drive the front scrapers 71 and 72 and the side scrapers 73 and 74. The scrapers 71 to 74 thus scrape the compost materials about the opposed front corners of the device while the device travels in the tank 40. The scrapers 71 to 74 not only prevent the compost materials about the opposed front corners of the device from disturbing the forward traveling of the device but also collect the compost materials heaped on the corners of the fermentation tank 40 so as to let the compost materials to be processed by the device. Therefore, the scrapers 71 to 74 prevent nonuniform fermentation or anaerobic fermentation of the compost materials.

The rotational force of the main drive shaft 52 is also transmitted to the front harrow shafts 82 and the rear harrow shafts 83 through the harrow drive units 80 and the harrow power transmission units 81, thus to turn the front harrows 84 of the shafts 82 and the rear harrows 85 of the shafts 83. As a result of the turning motions of the harrows 84 and 85, the front harrows 84 push the compost materials heaped in front of the device to the center of the device or to the opposed sides of the device, while the rear harrows 85 scatter the compost materials poured from the buckets 25 of the bucket elevators 21, thus to let the mixed compost materials be evenly heaped in the tank 40.

In the fermentation promoting device of the second embodiment of the invention, the conveyor power transmission unit 63, the scraper power transmission unit 75 and the harrow power transmission units 81 are provided with typical clutching units (not shown) respectively so that the units 63, 75 and 81 are manually or automatically controlled by a control unit (not shown) so as to stop or start their power transmitting operations. For example, when there is small amount of compost materials poured in back of the device, the harrow power transmission units 81 are controlled so as to stop the power transmission to the rear harrows 85, thus to save power. In addition, the scraper power transmission unit 75 may be controlled such that the scrapers 71 to 74 provided in the left side of the device and the scrapers 71 to 74 provided in the right side of the device are alternately operated and effectively scrape the compost materials in the tank 40.

In the above second embodiment, the fermentation promoting device is provided with two bucket elevators and two pairs of front and rear harrows. However, it should be understood that the device of the invention may be provided with three or more bucket elevators in accordance with width and height of the fermentation tank as described above. In addition, when the heaping height of the compost materials in the fermentation tank is relatively high, the bucket elevators may be heightened and, at the same time, the harrows may be heightened in their positions or formed into multi-stage structures as described above.

Hereinbelow, the compost preparation process using the fermentation system having the fermentation promoting device of the invention will be described.

The compost preparation process using the system of the invention comprises a first step for charging the moisture control materials in the fermentation tank, a second step for supplying the excrement to the compost materials charged in the tank, a third step for aerobic fermentation of the compost materials, a fourth step for mixing the compost materials together, and a fifth step for additional supply of moisture control materials to the existing compost materials. The above steps are repeated continuously until the compost materials charged in the tank become good compost as a result of aerobic fermentation. The individual steps of the compost preparation process are carried out as follows.

1. Stuffing moisture control materials:

The fermentation tank are stuffed with Moisture control materials, for example, rice hulls, sawdust, wood pieces, leaves and trunks of plants. In this case, it is more preferred to use the moisture control materials in the dry state in view of optimum of the fermentation atmosphere of the compost materials during the fermentation step. While the moisture control materials are charged in the fermentation tank, the fermentation promoting device of the invention is parked on a position in the tank so that the moisture control materials are densely charged in the tank except for the device parking space. However, the device should be prevented from buried under the moisture control materials.

2. Supplying of excrement:

After charging the moisture control materials, the excrement or the human excrement and the animal excrement of the excrement reservoir is pumped up by a typical pump and supplied to the excrement supply duct 101 and sprayed on the surface of the moisture control materials charged in the tank 40 from the excrement spraying nozzle 102.

3. Fermentation:

After supply of the excrement for the tank, the compost raw materials mixture of the moisture control materials and the excrement are fermented while keeping an appropriate fermentation temperature of the tank 40 by closing or opening the openable curtains 106 of the roof 100. That is, the curtains 106 are not closed in the summer season when the atmospheric temperature is not less than 30° C., but the curtains 106 are closed in the winter season so as to keep the appropriate temperature suitable for fermentation of the compost materials. After the compost materials mixture have been fermented for 4 or 5 days, the oxygen included in the moisture control materials has been mostly consumed for the fermentation of the compost materials so that it is required to mix the compost materials together using the fermentation promoting device of the invention and to supply new air into the compost materials. During this fermentation step, the inner temperature of the compost materials maintain to at least 60° C. so that the unnecessary moisture of the compost materials is vaporized and this lets the compost materials be free from decaying bacteria, vermin eggs and noxious plant seeds.

4. Mixing of compost materials:

After the compost materials have been fermented for 4 or 5 days, the fermentation promoting device of the invention is started so as to mix the compost materials together and to supply new air for the compost materials. When the device is started and slowly travels forward, the buckets of the moving bucket elevators of the device are loaded with compost materials in front of the device one by one and move upward along the slopes of the bucket conveyor and reach the compost pouring sections of the bucket elevators. At the compost pouring sections of the bucket elevators, the buckets loaded with the compost materials are turned at 180° so that the compost materials are poured from the buckets onto the bottom of the tank in back of the rear protector plate of the device. While the compost materials are poured from the buckets 25 of the bucket elevators 21, the rear harrows 73 and 74 uniformly scatter the compost materials and make the compost materials be come into contact with the air. Therefore, the compost materials are supplied with sufficient amount of oxygen for aerobic fermentation. It is sufficient to carry out the mixing operation for the compost materials once, however, it should be understood that the aerobic fermentation of the compost materials may be more promoted by carrying out the mixing operation twice or three times. However, repeated mixing operations for the compost materials may reduce the inner temperature of the compost materials, so that it will be sufficient to mix the compost materials together once during the winter season if sufficient amount of oxygen is supplied to the compost materials.

5. Daily addition of moisture control materials and excrement:

After the compost material mixing operation, new moisture control materials and new excrement are added to the existing compost materials by about one or two percents by the total volume of the existing compost materials day after day.

During the above compost fermentation process, the moisture control materials of the compost materials are slowly deformed in their tissue structures and reduce in their volumes and weights such that the weights of the compost materials are reduced at a rate of one or two percents per a day and the volumes of the compost materials are reduced at a higher rate. Therefore, there is neither compost material nor fermented liquid overflowing the fermentation tank even when the new moisture control materials and the new excrement are added to the existing compost materials by about one or two percents by the total volume of the existing compost materials day after day. After lapse of about 15 to 20 days with the above steps, the compost door of the fermentation tank is opened and the prepared compost is discharged from the fermentation tank and used for cultivation of plants. Of course, the aerobic fermentation time for the compost may exceed 20 days and, furthermore, the fermentation may be continued for several months.

As described above, the fermentation system installed with the fermentation promoting device of the invention readily ferments any organic materials through aerobic fermentation and prepares good organic compost, thus to preferably reuse the excrement, which may be environmental polluting materials, as good compost and to prevent possible environmental pollution. The size of the fermentation promoting device can be adjusted in accordance with the scale of a stock farm so that the device can provide a small-sized compost fermentation system suitable for installed in and used by a small-scaled stock farm as well as a large-sized compost fermentation system suitable for installed in and used by a large-scaled stock farm. That is, the number of bucket elevators of the device can be changed in accordance with the scale of the stock farm so that the device can be used by a small-scaled stock farm and a large-scaled stock farm. As the compost materials in the fermentation tank are continuously fermented at a high temperature so that even when the excrement is put in the tank without distinction of the feces from the urine, the moisture of the urine is vaporized into the atmosphere and there is no problem in keeping appropriate moisture of the compost. As the excrement is put in the tank without distinction of the feces from the urine, the fermentation system of the invention lets the feces and the urine be commonly collected in a single excrement reservoir prior to supply of them to the fermentation tank.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An aerobic fermentation system comprising:
   a fermentation tank connected to an excrement reservoir and charged with compost materials, and equipped with a fermentation promoting device periodically mixing said compost materials together, said fermentation tank including;
   a compost discharge door provided in a side wall of said tank and adapted for discharging compost after fermentation of said compost;
   arcuate guide rails placed in corners of said tank such that said guide rails are leveled with a mounting position of steering rollers mounted on the outer surfaces of side beams of said fermentation promoting device;
   a center wall placed in the center of said tank, said center wall being provided with outside air supply means;
   direction control units provided at front and rear ends of said center wall for controlling a turning direction of the fermentation promoting device in corners of the tank, each said direction control unit being leveled with the steering rollers of the device, one side surface of each said control unit having a taper surface tapered to the turning direction of said device, while the other side surface of each said control unit having a notch;

a roof stretched over said tank, said roof being provided with a first excrement supply duct, said excrement supply duct extending from said excrement reservoir and provided with a first excrement spraying nozzle so that the excrement of the reservoir is supplied to the nozzle through the duct and sprayed by the spraying nozzle; and openable curtains provided on the sides of the roof, said curtains being closed or opened in order to control temperature inside the tank.

2. The fermentation system according to claim 1, wherein said excrement supply means includes a second excrement spraying nozzle provided on the top of said center wall and connected to a second excrement supply duct; and said outside air supply means includes an air injection nozzle connected to an air supply duct, said air injection nozzle being directed downward such that it opens to the inside of said tank.

3. The fermentation system according to claim 1, wherein a tip of each said direction control unit is provided with a semicircular guide rail.

4. An aerobic fermentation promoting device comprising a frame unit for supporting bucket elevators for carrying material, a screw conveyor unit for conveying material to the bucket elevators, a drive unit, and a steering unit connected to the frame unit for smoothly guiding movement of the device, wherein said drive unit has one drive motor supported by said frame unit, the drive motor directly applying a rotating force to rear wheels connected to the frame unit to move the device and to a main drive shaft, said main drive shaft being connected to said screw conveyor unit by means of a screw transmission unit, a pair of scraper drive units by means of a scraper transmission unit, and a pair of harrow drive units by means of a harrow power transmission unit and thereby rotating said screw conveyor unit, said scraper drive units and said harrow drive units.

5. The fermentation promoting device according to claim 4, wherein said screw conveyor unit further comprises a side conveyor power transmission unit connected to said main drive shaft through the screw transmission unit, a friction roller connected to the side conveyor power transmission unit, and a power transmission belt wrapped around the friction roller, wherein the rotating force of said main drive shaft rotates the power transmission belt through the friction roller and side conveyor power transmission unit.

6. The fermentation promoting device according to claim 4, wherein each of said scraper drive units includes:

a front top scraper and a front bottom scraper placed up and down in the front of each front corner of said device; and a side top scraper and a side bottom scraper placed up and down in the side of each front corner of the device.

7. The fermentation promoting device according to claim 4, wherein each of said harrow drive units is connected to the main drive shaft through an associated power transmission unit provided on a side surface of an associated bucket elevator, each said harrow drive unit including a front harrow drive shaft having a rotatable front harrow and a rear harrow drive shaft having a rotatable rear harrow.

* * * * *